United States Patent [19]

Occhialini

[11] 4,290,718
[45] Sep. 22, 1981

[54] TOOLS FOR BEVELLING AND DEBURRING GEARS

[75] Inventor: Carlo Occhialini, Bologna, Italy

[73] Assignee: Samputensili S.p.A., Bologna, Italy

[21] Appl. No.: 899,468

[22] Filed: Apr. 24, 1978

[30] Foreign Application Priority Data

May 3, 1977 [IT] Italy .................................. 3420 A/77

[51] Int. Cl.³ .............................................. B23F 19/10
[52] U.S. Cl. ........................................ 409/8; 29/90 B;
   29/159.2; 72/71; 72/102; 407/1; 407/31
[58] Field of Search ...................... 90/1.4; 72/71, 102,
   72/108; 29/159.2, 90 B; 407/1, 27, 31; 409/8, 9

[56] References Cited

U.S. PATENT DOCUMENTS

| 2,206,443 | 7/1940 | Barter et al. ........................... 90/1.4 |
| 2,206,450 | 7/1940 | Christman ............................. 90/1.4 |
| 3,729,967 | 5/1973 | Bauknecht et al. ................. 29/159.2 |
| 3,735,619 | 5/1973 | Tersch ................................ 409/9 X |

FOREIGN PATENT DOCUMENTS 2542372  9/1976  Fed. Rep. of Germany .......... 409/8

Primary Examiner—Z. R. Bilinsky
Attorney, Agent, or Firm—Martin A. Farber

[57] ABSTRACT

A tool for bevelling and deburring gears comprising a deburring tool having profiled teeth which are straight with a taper decreasing from the periphery towards the center and a pair of deburring discs operatively connected to the toothed member.

13 Claims, 9 Drawing Figures

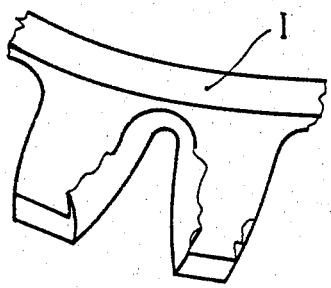
FIG.1
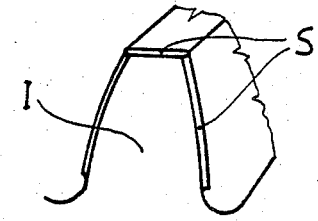
FIG.2'
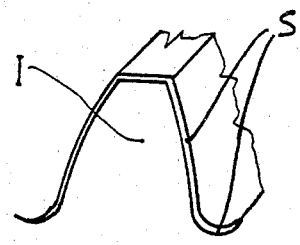
FIG.2"
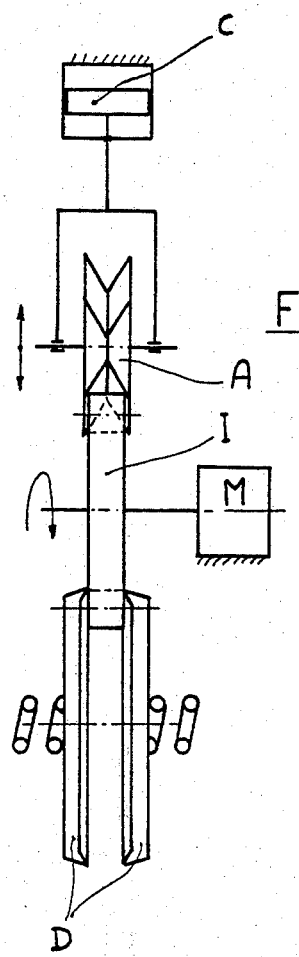
FIG.6
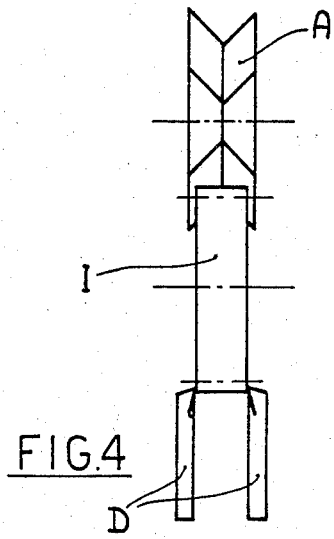
FIG.4

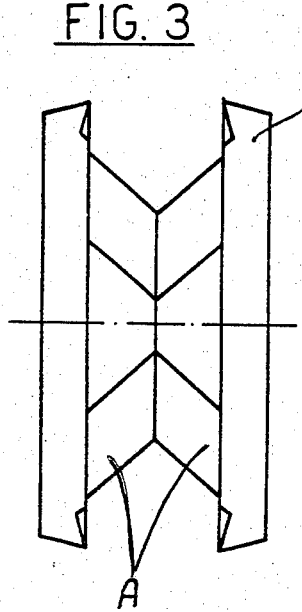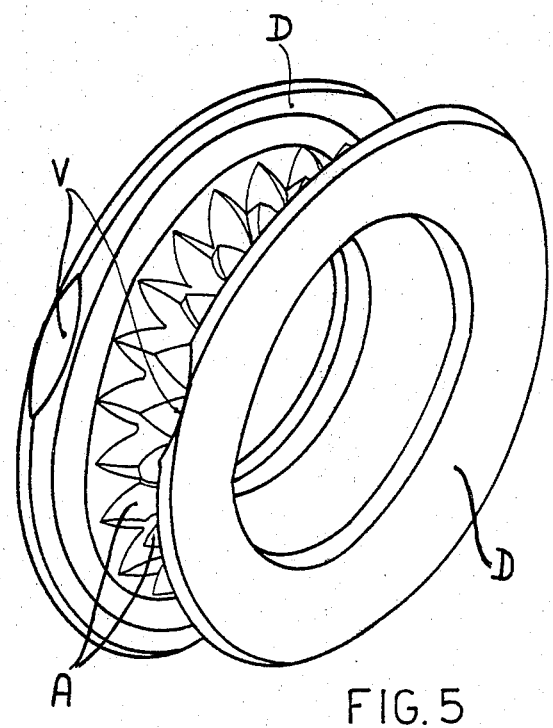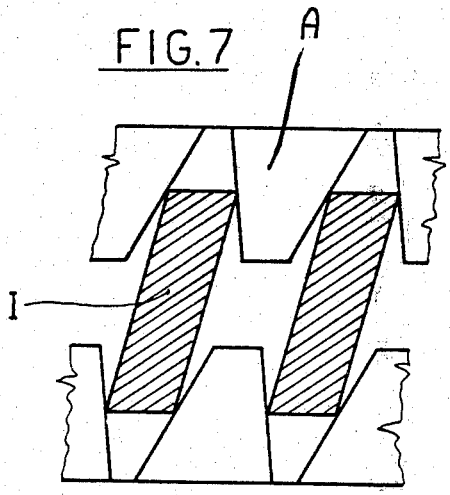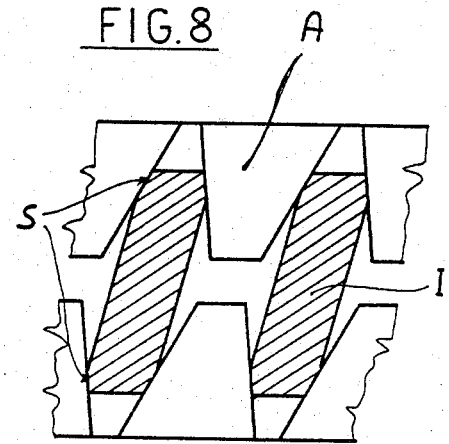

TOOLS FOR BEVELLING AND DEBURRING GEARS

This invention relates to an improvement to tools for bevelling and deburring gears.

It is, in fact, known that it is necessary to bevel the edges of the teeth of gears in order to prevent dents and deformations which could render them noisy, and also to eliminate the residual cutting burr which, when it comes away, can first damage the scraper tools and then the gears themselves during operation.

In Italian Patent Application No. 3349 A/75 a bevelling tool was described and illustrated which was in the form of a gear with suitably contoured teeth which meshed with the teeth of the gear to be finished and bevelled the edges thereon. The said tool was coupled with a second tool made in various shapes which, gliding laterally over the tooth of the gear to be finished, removed from this the burr left after the gear cutting operation. Despite the fact that the said system had notable advantages insofar as the bevelling of the edges and the removal of lateral burr is concerned, it did have a number of problems, such as the difficulty and the cost of making tools with concave profiled teeth for the bevelling operations, combined with the fact that the deburring tools were costly but did not last long.

The object of the present invention is to introduce improvements to tools of the aforementioned type, so as to bring about a reduction in the cost of the said tools and, moreover, to better both their function aspects and their life span.

In order that the foregoing can be achieved, the bevelling tool no longer has concave profile teeth but teeth that are straight, and it is mounted on a machine provided with a device which keeps the said tool pressed up against the gear throughout the full span of the bevelling operation. The said bevelling operation thus takes place through directly applied pressure and the cold creep of the material in the region of the edge of the tooth, and it is no longer the result of interference between two different profiles.

The deburring tool, in turn, no longer has a number of small cutting profiles which are difficult to create, are consequently costly and easily wear out but, instead, is constituted by a single disc with a circular, continuous, contour, which on account of its simple yet robust configuration, offers indisputable advantages in cost and duration. When the said profile comes into contact with the side of the tooth, a rubbing action is brought about which results in the consequential removal of the residual burr.

Other objects and advantages will emerge from the following description and from the accompanying drawings which illustrate diagrammatically, by way of an example, one form of embodiment for the invention.

With reference to the said drawings,

FIG. 1 shows how a tooth of a gear is prior to the bevelling and deburring operations;

FIGS. 2' and 2" show the tooth after the finishing operation has been carried out on the profile of the sides only and also on the bottom, respectively, it also being possible to effect the said operation on one side only;

FIG. 3 shows, in a lateral view, the two tools coupled together;

FIG. 4 shows both tools but this time separated;

FIG. 5 shows, in a perspective view, the said tools coupled together and the bevel lead-in points for the gear;

FIG. 6 shows, in a general diagrammatic view, the machine with its drive motor and its piston for the pressing operation;

FIGS. 7 and 8 show, on the flat, a section of the tool and of the gear before and after the bevelling operation, respectively.

The bevelling tool A, pressed down by the piston C against the gear I, meshes with the gear itself and bevels the edges S thereon, following angles predetermined in the design of the said tool. The two deburring discs D, on the same axis as the tool A, or separated therefrom, glide over the sides of the teeth and remove the burr from these. The design of the machine is such that after each finished cycle, the bevel lead-in points V (FIG. 5) always return to the charging side, thereby preventing damage from occurring to the gear I and interruptions to the work cycle. Instead of being circular in shape, the bevelling tool can take the form of a rack, and this without the operation being in any way adversely affected. Furthermore, the deburring tool can have a flat blade (FIG. 4) instead of a disc shaped blade (FIG. 3).

It is understood that the present invention, as described herein and illustrated diagrammatically by way of an example, can be extended to cover any variants which, as such, fall within the framework of protection afforded thereto.

What is claimed is:

1. A tool for bevelling and deburring gear teeth of gears, comprising a first member comprising two spaced apart cooperating parts forming a gear-shaped, toothed bevelling tool, each said parts having profiled teeth each formed with two sides extending toward the other of said parts, said sides being engageable simultaneously with four corners of gear teeth of gears to be bevelled, both of said sides of said profiled teeth being straight along their entire length and adjacent of said sides of adjacent of said profiled teeth on each of said cooperating parts, respectively, being inclined relative to an axis of the gears to be bevelled and tapering along their entire length convergingly in a direction away from the other of said cooperating parts, respectively and defining spaces therebetween adapted to receive the gear teeth of the gears to be bevelled, said profiled teeth of each one of said cooperating parts define narrowmost bases opposite and freely spaced apart from each other with nothing therebetween and at variable distances depending on the thicknesses of the gear teeth of the gears to be bevelled such that various thicknesses of the gear teeth of the gears to be bevelled can be accommodated between and contacting all said adjacent sides of said profiled teeth with said cooperating parts and said bases displacable apart accommodatingly relative to each other, whereby both sides of the gear teeth of said gears to be bevelled are bevelled simultaneously by both said adjacent sides of said adjacent teeth of said cooperating parts, respectively, a second member comprising a pair of deburring discs, said deburring discs having smooth profiles inclined relative to each other, axial take-up means for always pressing said profiles of said deburring discs against opposite lateral sides of the gear teeth of said gears to be bevelled and deburred on only one continuous circumferential line, means for keeping said two spaced apart cooperating parts of said bevelling tool pressed against a gear being bevelled during an entire bevelling operation, whereby as a result of both said means all bevelling and deburring are performed with the same nominal dimensions, the deburring discs each being formed with a bevel means for facilitating the leading-in of the gear to be vevelled, and said bevels always being in the same position on the machine at the commencement of each finishing cycle.

2. The tool as set forth in claim 1, wherein the bevelling tool and said deburring discs are mounted coupled on the same axis.

3. The tool as set forth in claim 1, wherein said second mentioned means is a hydraulic piston means for mechanically keeping said bevelling tool pressed up against the gear bevelled.

4. The tool as set forth in claim 1, wherein said bevelling tool constitutes means for bevelling edges both on at least one side and on the bottom of the teeth of the gear to be bevelled.

5. The tool as set forth in claim 1, wherein the deburring discs are circular.

6. The tool as set forth in claim 1, wherein the deburring discs are flat.

7. The tool as set forth in claim 1, wherein said axial take-up means are elastic means.

8. The tool according to claim 1, wherein said cooperating parts are circular in shape.

9. The tool according to claim 1, wherein said teeth are trapezoidal with small free base ends of said teeth of respective said cooperating parts spaced apart facing each other.

10. The tool according to claim 1, wherein said deburring discs each have a continuous circular profile.

11. A tool for bevelling and deburring gear teeth of gears, comprising a first member forming a gear-shaped, toothed bevelling tool, having profiled teeth each formed with two sides, said sides being engageable simultaneously with four corners of gear teeth of gears to be bevelled, both of said sides of said profiled teeth being straight and adjacent of said sides of adjacent of said profiled teeth all being inclined relative to an axis of the gears to be bevelled and tapering convergingly in a lateral direction away from the bevelling tool, and defining spaces therebetween adapted to receive the gear teeth of gears to be bevelled, said profiled teeth of each one of said cooperating parts define narrowmost bases opposite and freely spaced apart from each other with nothing therebetween at variable distances depending on the thicknesses of the gear teeth of the gears to be bevelled such that various thicknesses of the gear teeth of the gears to be bevelled can be accommodated between and contacting all said adjacent sides of said profiled teeth with said cooperating parts and said bases displaceable apart accommodatingly relative to each other, whereby both sides of the gear teeth of said gears to be bevelled are bevelled simultaneously by both said adjacent sides of said adjacent teeth of said cooperating parts, respectively, a second member comprising a pair of deburring discs, said deburring discs having smooth profiles inclined relative to each other, axial take-up means for always pressing said profiles of said deburring discs against opposite lateral sides of the gear teeth of said gears to be bevelled and deburred on only one continuous circumferential line, means for keeping said two cooperating parts of said bevelling tool pressed against a gear being bevelled during an entire bevelling operation, whereby as a result of both said means all bevelling and deburring are performed with the same nominal dimensions, a first axis, a second axis, parallel to said first axis said bevelling tool and said deburring discs being respectively mounted coupled on said two separate parallel axes.

12. A tool for bevelling and deburring gear teeth of gears, comprising a first member forming a gear-shaped, toothed bevelling tool, having profiled teeth formed with sides, said sides being engageable with gear teeth of gears to be bevelled, said sides of said profiled teeth being straight and adjacent of said sides of adjacent of said profiled teeth tapering convergingly in a lateral direction away from the bevelling tool, and defining spaces therebetween adapted to receive the gear teeth of gears to be bevelled, whereby both sides of the gear teeth of said gears to be bevelled can be bevelled simultaneously by both said adjacent sides of said adjacent teeth of said cooperating parts, respectively, a second member comprising a pair of deburring discs, said deburring discs having profiles inclined relative to each other, axial take-up means for always pressing said deburring discs against opposite lateral sides of the gear teeth of said gears to be bevelled and deburred, means for keeping said two cooperating parts of said bevelling tool pressed against a gear being bevelled during an entire bevelling operation, whereby as a result of both said means all bevelling and deburring are performed with the same nominal dimensions, the deburring discs are each formed with a bevel means for facilitating the leading-in of the gear to be bevelled, and said bevels are always in the same position on the machine at the commencement of each finishing cycle.

13. A tool for bevelling and deburring gear teeth of gears, comprising a first member forming a gear-shaped, toothed bevelling tool, having profiled teeth each formed with two sides, said sides being engageable with gear teeth of gears to be bevelled, both of said sides of said profiled teeth being straight and adjacent of said sides of adjacent of said profiled teeth all being inclined relative to an axis of the gears to be bevelled and tapering convergingly in a lateral direction away from the bevelling tool, and defining spaces therebetween adapted to receive the gear teeth of gears to be bevelled, said profiled teeth of each one of said cooperating parts define narrowmost bases opposite and freely spaced apart from each other with nothing therebetween at variable distances depending on the thicknesses of the gear teeth of the gears to be bevelled such that various thicknesses of the gear teeth of the gears to be bevelled can be accommodated between and contacting all said adjacent sides of said profiled teeth with said cooperating parts and said bases displaceable apart accommodatingly relative to each other, whereby both sides of the gear teeth of said gears to be bevelled are bevelled simultaneously by both said adjacent sides of said adjacent teeth of said cooperating parts, respectively, a second member comprising a pair of deburring discs, said deburring discs having smooth profiles inclined relative to each other, axial take-up means for always pressing said profiles of said deburring discs against opposite lateral sides of the gear teeth of said gears to be bevelled and deburred on only one continuous circumferential line, means for keeping said two cooperating parts of said bevelling tool pressed against a gear being bevelled during an entire bevelling operation, whereby as a result of both said means all bevelling and deburring are performed with the same nominal dimensions, said last-mentioned means further varying the bevelling depth of the gear teeth of the gears to be bevelled, the deburring discs each being formed with a bevel means for facilitating the leading-in of the gear to be bevelled, and said bevels always being in the same position on the machine at the commencement of each finishing cycle.

* * * * *

UNITED STATES PATENT AND TRADEMARK OFFICE
CERTIFICATE OF CORRECTION

PATENT NO. : 4,290,718
DATED : September 22, 1981
INVENTOR(S) : Carlo Occhialini It is certified that error appears in the above-identified patent and that said Letters Patent are hereby corrected as shown below:

column 4
Claim 12,     Line 53    "bevels" should read --bevel means--

*Signed and Sealed this*

*Twenty-second* Day of *December 1981*

[SEAL]

Attest:

GERALD J. MOSSINGHOFF

*Attesting Officer*     *Commissioner of Patents and Trademarks*